Jan. 31, 1928. 1,657,838
A. NAGEL
APPARATUS FOR MEASURING LIQUID FUEL
Filed Sept. 9. 1924 4 Sheets-Sheet 1

Inventor
A. Nagel
By Marks & Clerk
Attys.

Jan. 31, 1928.

A. NAGEL 1,657,838

APPARATUS FOR MEASURING LIQUID FUEL

Filed Sept. 9, 1924 4 Sheets-Sheet 2

Inventor
A. Nagel
By Marks & Clerk
Att'ys.

Jan. 31, 1928.

A. NAGEL 1,657,838

APPARATUS FOR MEASURING LIQUID FUEL

Filed Sept. 9, 1924  4 Sheets-Sheet 3

Inventor
A. Nagel
By Marks & Clerk
Attys.

Patented Jan. 31, 1928.

1,657,838

UNITED STATES PATENT OFFICE.

AUGUST NAGEL, OF STUTTGART, GERMANY.

APPARATUS FOR MEASURING LIQUID FUEL.

Application filed September 9, 1924, Serial No. 736,771, and in Germany September 10, 1923.

This invention relates to a device for accurately adjusting the action of the tilting weight which controls the inlet and outlet valve of the measuring vessel of a liquid measuring apparatus, which tilting weight is caused to tilt alternately either way by a driving member which is rocked through the rising and falling of the float. According to the present invention the driving member is provided between its driving pins with yielding stops which at first prevent the weight tilting after it has passed the dead-centre position, until the yielding stops co-act with fixed adjustable stops and, passing within the path of the arm of the weight, which rests against them cause the weight to tilt over.

Figure 1:
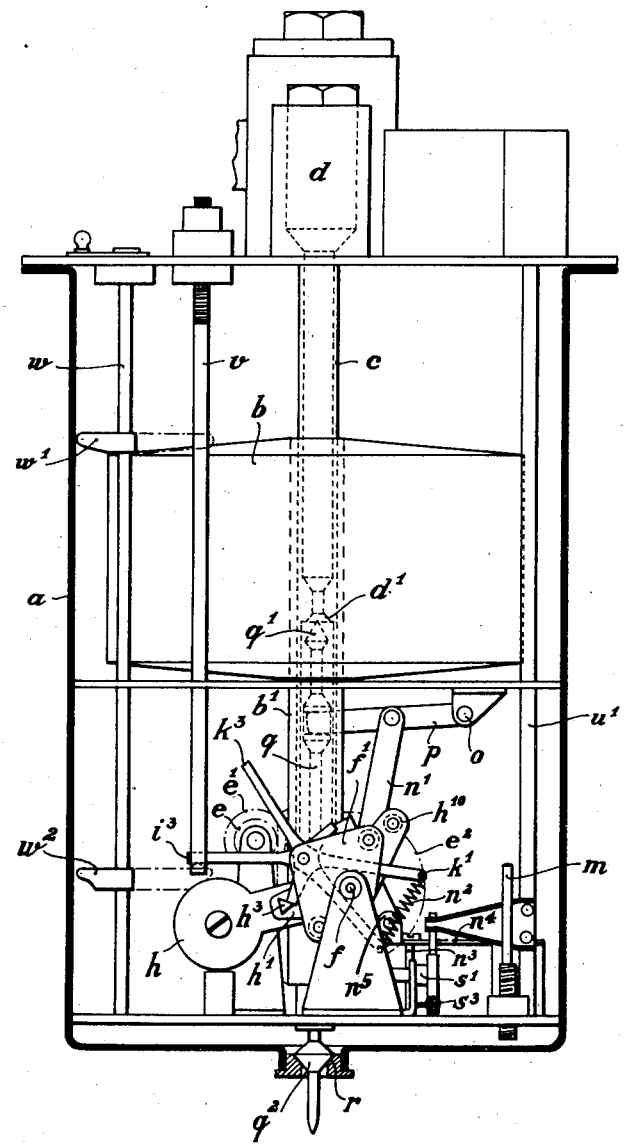
Figure 2:
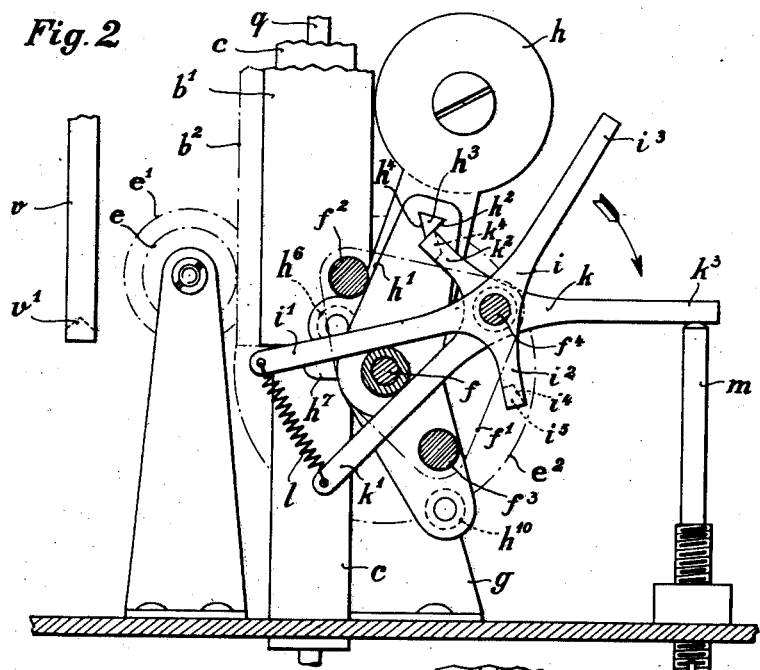
Figure 3:
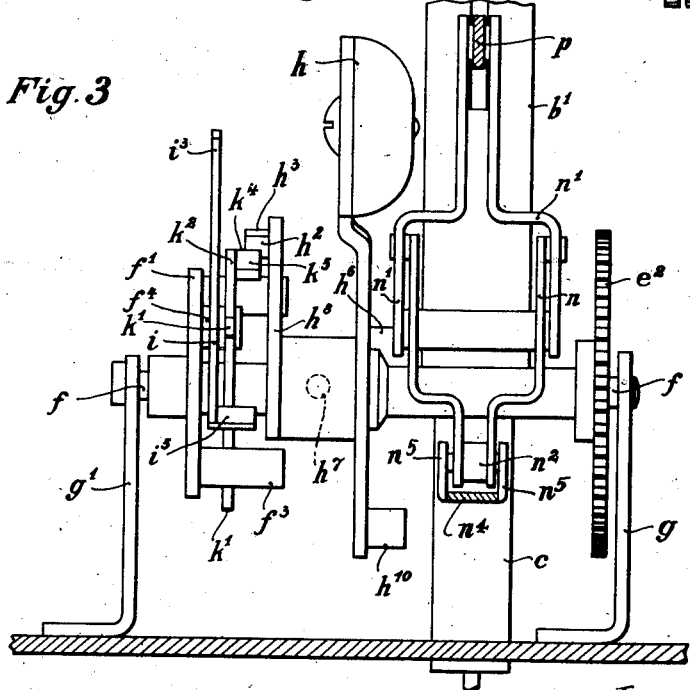
Figure 4:
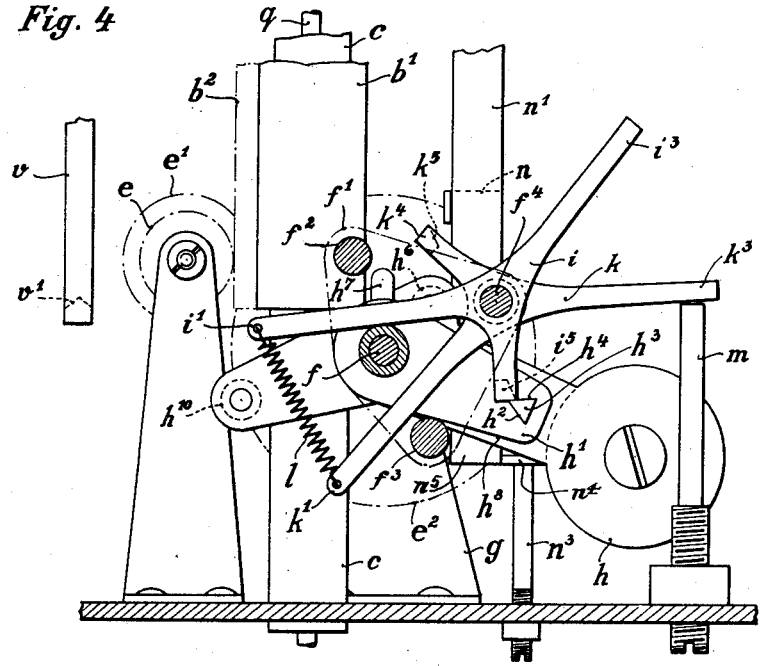
Figure 5:
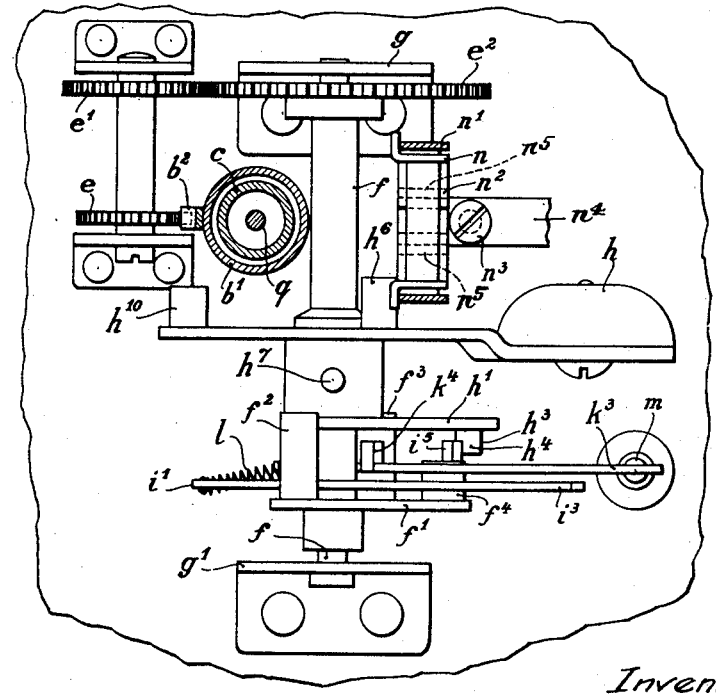
Figure 6:
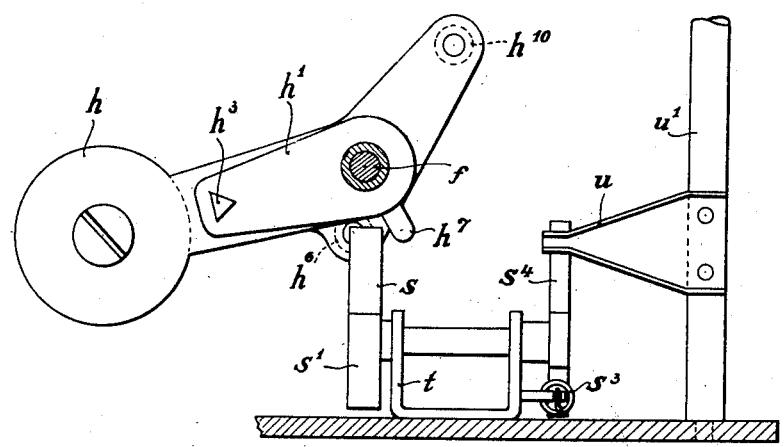
Figure 7:
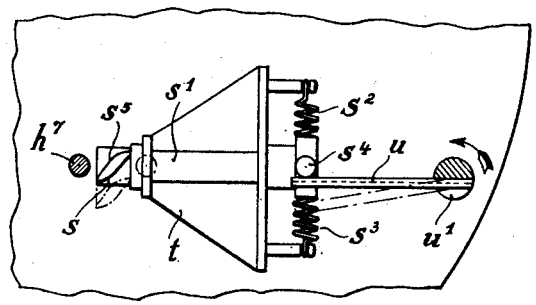

A constructional example of the invention is shown in the accompanying drawing,

Fig. 1 representing the whole apparatus showing all the parts in the measuring chamber, which is in longitudinal section, Fig. 2 showing the falling weight mechanism during the upward movement of the float with the adjusting lever resting on the adjusting pin at the commencement of the rocking movement of the adjusting lever, Fig. 3 a side view of Fig. 2, Fig. 4 the falling weight mechanism with the float in its top position, Fig. 5 a plan view of Fig. 4, Fig. 6 the gear for controlling the meter mechanism in side elevation and Fig. 7 a plan view of Fig. 6.

In the measuring chamber $a$ is the float $b$, which is provided with a tubular extension $b^1$, on which there is a rack or the like $b^2$. The float is guided by a tube $c$, which is connected to the fuel inlet member $d$. The fuel inlet valve $d^1$ is preferably placed low down in the tube $c$. The rack $b^1$ turns a pinion $e$ of the falling weight mechanism in a known manner, whereby the motion is transmitted to the toothed wheel $e^1$ on the same shaft and thence to the driving wheel $e^2$ on the main shaft $f$, which is journalled in the frame members $g$, $g^1$ (Figures 3 and 4). Fixed to the main shaft $f$ is the disc $f^1$ with the pins $f^2$, $f^3$, which act as drivers for the weight $h$, which is mounted loosely on the shaft $f$. On the same driving disc $f^1$ is a bearing $f^4$, about which the levers $i$ and $k$ are adapted to rock. The said levers are each provided with three operative arms $i^1$, $i^2$, $i^3$ and $k^1$, $k^2$, $k^3$. The arms $i^1$, $k^1$ lying on either side of the main shaft $f$ are connected together by the spring $l$. On the float $b$ moving upwards, for instance, on the liquid fuel flowing into the measuring chamber $a$, the tube $b^1$ along with the rack $b^2$ will of course take part in this movement. The straight vertical movement of the rack $b^2$ effects a rotation of the pinion $e$, which meshes with the rack $b^2$, the motion being transmitted through the toothed wheels $e^1$, $e^2$ to the main shaft $f$ of the falling weight mechanism, which turns in the opposite sense. The disc $f^1$ moves in the same direction, as the shaft $f$, and abuts with its driving pin $f^2$ against one longitudinal side of the lever $h^1$ of the weight, the surface $h^2$ of the member $h^3$ being in such a position with respect to the projecting piece $k^4$ on the arm $k^2$ of the lever $k$ that, on the weight $h$ being brought into its falling position, the lever $k$ does not release it. Only after the arm $k^3$ of the lever $k$ has come in contact with the preliminary or coarse adjustment pin $m$ and, through the further rotation of the disc $f^1$ (owing to the continued upward movement of the float), the lever $k$ is rocked about its pivot $f^4$, the projecting part $k^4$ on the arm $k^2$ will slide along the face $h^2$ of the lever of the falling weight and release the latter. This will have stressed the spring $l$ as the lever arm $i^1$ remains in contact with the main shaft $f$, but the lever arm $k^1$ is no longer in contact with the said shaft. The member $h^3$ on the weight lever now slides downwards, strikes against the face $i^4$ of the member $i^5$, forces the arm $i^2$ backwards, while slightly removing the lever arm $i^1$ from the main shaft, and passes under the member $i^5$ so that its face $h^4$ is in contact with the latter. During this falling movement the pin $h^5$ on the weight lever has come in contact with the toggle joint $n$ (see Fig. 4) and will have caused the latter to straighten out. As the part $n^1$ of the toggle joint is connected to the operating lever $p$ of the valve rod-work, which is pivotally mounted in the bearing $o$, the valve rod $q$ will be moved upwards and the valve cone $q^1$ will be pressed firmly into the valve seating $d^1$, while the cone $q^2$ of the outflow valve will be raised from its seating $r$.

During this operation of the valves the pin $h^7$ on the hollow shaft connecting the weight lever $h^1$ to the weight $h$ will have moved past a sliding surface $s$ of a part $s^1$ (Fig. 6), which is journalled in the frame member $t$ and is adapted to rock both ways, and will have forced the part $s^1$ out of its vertical position. This movement will have extended the spring $s^2$ and have compressed the spring $s^3$ on the other side, which acts in opposition to it. This balanced spring arrangement has the object of indicating that the measuring vessel $a$ is empty and of showing this by electric transmission by means of a meter. For this purpose a pin $s^4$ is provided on the opposite side to the sliding surface $s$ of the part $s^1$, which pin on the part $s^1$ swinging aside moves away from the surface $u$ of the controlling gear $u^1$ of the meter and therefore does not transmit its motion to this gear (see Figs. 6 and 7).

The operation is different, when, owing to the downward movement of the float $b$, the falling weight mechanism moves in the opposite sense. In this case the disc $f^1$ rotates in the opposite direction to that shown by the arrow (Fig. 4). The driving pin $f^3$ comes in contact with the surface $h^8$ of the weight lever $h^1$ and the pin $h^7$ moves along the sliding surface $s^5$ of the part $s^1$, forces the latter to one side or causes it to rock, forces the pin $s^4$ against the surface $u$ and turns the rodwork operating the meter, whereby the meter is caused to indicate that the measuring chamber is empty (see Fig. 7).

At the same time the disc $f^1$ continues to turn. The weight $h$ is brought into the other falling position, but is not released, as the face $h^4$ of the member $h^3$ on the weight lever rests against the projection $i^5$ of the lever $i$, until as the lever arm $i^3$ strikes against the fine adjustment rod-work $v$ or against the face $v^1$ of the same. The lever $i$ is thereupon rocked about the bearing $f^4$, the member $i^5$, which up to this point has acted as an abutment for the face $h^4$ of the member $h^3$ of the weight lever $h^1$, releases the latter and the weight drops down. In order suitably to regulate this releasing of the falling weight lever, the rodwork $v$ is made vertically adjustable by means of a screw (Fig. 1). The same purpose is served by the coarse adjustment pin $m$ already referred to, when the system of levers moves in the opposite direction (Fig. 2). The face $h^4$ thereupon slides over the face $k^5$ on the lever arm $k^2$, pressing the latter backwards and passing under the face $k^4$. At the same time the pin $h^{10}$ of the weight $h$ will have acted on the toggle joint $n$ in such a manner that the latter has been moved from its extended to its bent position and the changeover of the valve has taken place. The valve $q^2$ will in the meantime have moved onto its seat and the valve $q^1$ have opened.

As it is exceedingly difficult to effect the adjusting of the toggle joint $n$, $n^1$ with respect to the lever $p$ for tilting the valve rodwork, if the pivotal point $n^2$ for the same is made stationary and consequently there is no assurance that the valve member $q^1$ will rest reliably and firmly in the seat $d^1$, and since the toggle joint is intended to prevent the valve cone $q^1$ from lifting off its seat $d^1$ owing to the jolts which may be caused in many ways while the vehicle is in motion, the pivot $n^2$ is controlled by a spring $n^4$ which is connected at its end $n^5$ to the pivot $n^2$ and is capable of adjustment by means of an adjusting screw $n^3$.

This makes it possible for the toggle joint, on the falling weight $h$ throwing over and the pin $h^6$ pressing against the part $n$ of the toggle joint, not only to take up its fully stretched position, but to be bent slightly beyond this position (Fig. 4), and consequently to make it impossible for the valve cone $q^1$ to lift from its seat $d^1$ through an unintentional backward movement of the toggle joint, even when the pin $h^6$ with the falling weight moves away again from the toggle joint, a backward movement taking place.

In order to limit the action of the free falling weight $h$, the toggle joint parts $n$, $n^1$ are caused to act on each other by their bearings $n^2$ and $n$ being capable of adjustment relatively to one another by means of an adjusting screw or the like, in such a manner that they are kept in their stretched out position whereby they are prevented from automatically coming out from the said stretched out position.

Since, however, it would seem desirable for fixing the delivering or measuring apparatus for liquid fuel or the like in vehicles and when taking the same out, that the internal works including the float mechanism should be protected from having the parts shifted with respect to one another or even damaged through rough usage, a rod $w$ which is adapted to be turned from the outside by means of a lever is provided with two stop members $w^1$, $w^2$, one $w^1$, of which projects over the upper surface of the float $b$ and the other, $w^2$, extends over the tilting weight $h$.

What I claim is:—

1. A valve operating device, comprising a tilting weight, an arm rigidly connected with the tilting weight, a driving member for tilting the tilting weight, driving pins on the driving member, yielding stops mounted on the driving member projecting between the said driving pins and abutting against the arm rigidly connected with the tilting weight and second stops capable of being adjusted in a fixed position, the yielding stops being capable of first preventing the said weight from tilting after it has passed the dead centre position until they come against the said second stops and of being moved out of the way of the arm rigidly connected with the tilting weight and thereby allowing the latter to tilt over after they have come against the second stops.

2. A device as claimed in claim 1 in which a wedge-shaped member is provided on the arm rigidly connected with the tilting weight and in which yielding stops are constituted by two three-armed levers and a spring connecting one arm of the one lever with one arm of the other lever, these two arms enclosing between them the shaft of the driving member, two arms belonging to the two respective levers serving alternately to strike against the second stops whilst the remaining two arms of the two levers serve temporarily to support the tilting weight through the intermediary of the arm rigidly connected with the tilting weight and of the wedge-shaped member on the latter arm.

In testimony whereof I have signed my name to this specification.

AUGUST NAGEL.